United States Patent
Wu

(10) Patent No.: US 6,195,087 B1
(45) Date of Patent: Feb. 27, 2001

(54) METHOD AND DEVICE FOR PREVENTING THE JUMPING PHENOMENON OF AN OSD DISPLAY REGION ON A MONITOR SCREEN

(75) Inventor: Tsung-Hsun Wu, Taoyuan (TW)

(73) Assignee: Acer Peripherals, Inc. (TW)

( * ) Notice: Subject to any disclaimer, the term of this patent is extended or adjusted under 35 U.S.C. 154(b) by 0 days.

(21) Appl. No.: 09/095,053

(22) Filed: Jun. 10, 1998

(30) Foreign Application Priority Data

Feb. 6, 1998 (TW) .................................................. 87101608

(51) Int. Cl.[7] ........................................................ G09G 5/00
(52) U.S. Cl. ........................ 345/213; 345/18; 345/29; 345/212; 345/214
(58) Field of Search .......................... 345/211–213, 11, 345/13, 14, 18, 29, 58, 76, 78, 99, 214

(56) References Cited

U.S. PATENT DOCUMENTS

| 5,285,197 | * | 2/1994 | Schmidt et al. | 345/213 |
|---|---|---|---|---|
| 5,394,171 | * | 2/1995 | Rabii | 345/213 |
| 5,635,960 | * | 6/1997 | Onagawa | 345/213 |
| 5,790,083 | * | 8/1998 | Bassetti | 345/3 |
| 5,828,351 | * | 10/1998 | Wu | 345/11 |
| 5,917,461 | * | 6/1999 | Sakami et al. | 345/29 |
| 6,002,380 | * | 12/1999 | Lee | 345/13 |

* cited by examiner

Primary Examiner—Richard A. Hjerpe
Assistant Examiner—Henry N. Tran
(74) Attorney, Agent, or Firm—Pillsbury Winthrop LLP

(57) ABSTRACT

A method and device for preventing the jumping phenomenon of the OSD display region on a monitor screen. The anti-jumping device comprises it included a comparison circuit, a signal generator and a multiplexer. The comparison circuit is used for calculating a difference time between the front edges of pulses of the synchronizing signals Vs and Hs, and the front edge of a corresponding pulse, comparing the difference time with a fixed time and producing a selection signal according the comparison result. The selection signal represent the timing relation between Hs and Vs. The signal generator is used for generating two clear reference signals that can be applied in various timing situations. The multiplexer receives the two clear reference signal and employs the selection signal to select one of the two clear reference signal as a clear signal that is applied to a counter used for counting the scanning location in the OSD processing circuit.

14 Claims, 8 Drawing Sheets

METHOD AND DEVICE FOR PREVENTING THE JUMPING PHENOMENON OF AN OSD DISPLAY REGION ON A MONITOR SCREEN

BACKGROUND OF THE INVENTION

1. Field of the Invention

The present invention relates to a display technology provided with OSD (on-screen display) function, more specifically, to a technology for preventing the jumping phenomenon of the OSD display region on the monitor screen, which is frequently caused by the adjustment operation for adjusting display parameters, such as adjusting the H-phase (horizontal phase in the screen).

2. Description of the Related Art

Display devices (include TV, monitors of the computer, etc.) usually provide some tunable parameters for users to adjust some display features during practical operation. For example, H-size/V-size parameters are used to tune the size feature of the display screen and H-phase/V-phase parameters are used to tune the position feature of the display screen. PWM (pulse width modulation) waveforms are generally employed to transfer these displaying parameters set by the user to corresponding deflection circuits, thereby adjusting the practical appearance of the display screen. Thus, display devices can provide an operational mechanism for the users to readily adjust these displaying parameters.

There are two approaches to adjusting these displaying parameters by the users in the modern display devices. The first one is to adjust these display parameters by the LEDs (light-emitted diodes) and the keys mounted on the control panel of the display device. When a user selects one of these parameter by using a select key, an LED corresponding to the selected parameter is lit up to announce the selection result. At this time, the user can practically press an adjust key to adjust the value of the selected display parameter. The second one is to adjust the displaying parameters by using the OSD display and the keys. The difference between the two approaches is the indication manner for indicating operation information. When a user touches the select key on the panel, the OSD menu is activated and displayed. Therefore, a display region showing the OSD menu will appear on a certain screen location, indicating the information of various displaying parameters, respectively. Thus the user can select a displaying parameter that needs to be adjusted by depressing the select key. In fact, the two approaches described above are almost the same, except for the manner of displaying the operation information. Owing to the requirement of a great number of LEDs in the first approach and the superior display effect provided by the second approach, most of the modern display devices adopt the OSD menu to illustrate the operation information.

FIG. 1 is a block diagram of the image-processing circuit in the conventional monitor with OSD function. Referring to FIG. 1, R(red), G(green) and B(blue) are three image signals transmitted from a video card, which represent the information of the three primary color data, red, green and blue, respectively. In the normal display condition, the image signals R, G and B are processed by a mixer circuit 8 and a amplifier 10 and finally transmitted to a picture tube 2 of the CRT(cathode ray tube) for displaying the image. Meanwhile, a deflection circuit 4 can control the displaying feature for this image according to timing signals, such as horizontal synchronizing signal Hs and vertical synchronizing signal Vs. The synchronizing signals Hs and Vs look like pulsed signals having a plurality of pulses. The pulse width in the horizontal synchronizing signal Hs is generally narrower than that in the vertical synchronizing signal Vs. The horizontal synchronizing signal Hs is used to define horizontal scanning lines, and the vertical synchronizing signal Vs is used to define picture fields or frames, each of which comprises a great number of scanning lines. Then the image represented by the image signals R, G and B can be properly displayed on the screen under the control of the deflection circuit 4.

When a user activates the OSD display function, a microprocessor (not shown) in the display device will read out the letter image information ready to be displayed from an EEPPOM (not shown), and transmit it to an OSD circuit 6 for producing OSD image signals Rosd, Gosd and Bosd corresponding to the three primary colors. The OSD circuit 6 sends the OSD image signals (Rosd, Gosd, Bosd) and a blanking signal BLK to the mixer circuit 8. The blanking signal BLK is used to define an OSD display region on the display screen. When the blanking signal BLK=1, it represents that the currently scanning spot in the screen is the normal image region. Then the mixer circuit 8 can block the OSD image signals Rosd, Gosd and Bosd, and passes the normal image signals R, G and B to the amplifier 10. On the contrary, When the blanking signal BLK=0, it represents that the currently scanning spot in the screen is the OSD display region. Then the mixer circuit 8 can block the normal image signals R, G and B, and pass the OSD image signals Rosd, Gosd and Bosd to the amplifier 10.

The blanking signal BLK is determined by the relative timing relation between the synchronizing signals Hs and Vs, that is, by deciding the range of the scanning lines for the OSD display region. Assume that the OSD display region starts at the $240^{th}$ scanning line of the monitor screen, and totally occupies 120 scanning lines. Therefore, the OSD processing circuit begins to count the number of the scanning line when the vertical synchronizing signal indicates the top of the picture frame, outputs the blanking signal BLK=0 while counting the $240^{th}$ scanning line, and output the blanking signal BLK=1 while counting the $360^{th}$ scanning line.

According to the above-indicated description, the OSD display region can be determined by the synchronizing signals Hs and Vs, so the relation between the synchronizing signals Hs and Vs may affect the displaying of the OSD menu. The problem is that some adjusting operation for the display parameters, such as H-phase display parameter adjustment, may immediately affect the relative timing between the synchronizing signals Hs and Vs in the modern monitors. FIG. 2 and FIG. 3 illustrate the timing relation between the synchronizing signals Hs and Vs, before and after the adjustment of H-phase parameter in the prior art, for explaining the relative variation of the synchronizing signals Vs and Hs.

As the timing diagram shown in FIG. 2, before the adjustment operation, the front edge of a pulse of Vs (denoted by Ta) leads the front edge of a pulse of Hs (denoted by Tb), that is, Tb>Ta. In addition, the front edges of the synchronizing signals Hs and Vs are relatively close.

Since the two edges are quite close, it is possible that the timing relationship between the synchronizing signals Hs and Vs is changed when the user adjusts the H-phase parameter. Suppose that the timing relation between the synchronizing signals Hs and Vs is changed to the situation shown in FIG. 3 by applying a certain amount of H-phase adjustment. In the situation shown in FIG. 3, the front edge of the horizontal synchronizing signal Hs (denoted by Ta') leads the front edge of the vertical synchronizing signal Vs (denoted by Tb').

As described above, the OSD processing circuit decides how to transmit the blanking signal BLK according to the relative relation between the synchronizing signals Hs and Vs. Therefore, if during the adjustment of the H-phase parameter, the relation between the synchronizing signals Vs and Hs is changed from the case of "the edge of pulse of Vs leading" to "the edge of pulse of Hs leading", the OSD processing circuit might not correctly count the number of the scanning lines. Usually, there is a miss of one scanning line in counting. Such a miss may make the jumping of the OSD display region happen. This is a shortcoming of the prior art monitors having the OSD function.

One proposed method to solve this problem is implemented by using the technique of signal delaying. If some timing situations that may induce the jumping phenomenon of the OSD display region are known, the synchronizing signals Hs will be in advance delayed at a predetermined time to avoid the happening of the variation of the timing relation between the synchronizing signals Hs and Vs due to the adjustment of the H-phase parameter. However, this method can only solve the jumping problem in some known situations, and cannot be generally applied to all situations.

SUMMARY OF THE INVENTION

Therefore, an object of the present invention is to provide a apparatus and a method for preventing the jumping phenomenon of the OSD display region on a monitor screen happening, especially in all situations where the jumping of the OSD region may happen.

The present invention achieves the above-indicated objects by providing an apparatus for preventing the jumping phenomenon of the OSD display region on a monitor screen. The apparatus comprises an timer device for generating a timebase signal, a comparison circuit for comparing the timebase signal with the time difference between the front edges of the synchronizing signals Hs and Vs, a pulse generator for generating a first clear reference signal and a second clear reference signal and a multiplexer for selecting one of the two clear reference signals as the true clear signal of a counter. In addition, the second clear reference signal is delayed for a time period relative to the first clear reference signal. The purpose of the apparatus is to generate a clear signal used for a counter of the OSD circuit. The counter is used for estimating the scanning line that is currently scanned in the display screen for each of the picture frame.

The operation of the apparatus can be described as follows. First, the comparison circuit calculates the time difference between the corresponding front edges of the synchronizing signals Hs and Vs and compares the time difference with the timebase signal. If the time difference with respect to the synchronizing signals Vs and Hs is large than the time period defined by the timebase signal, it means that there is an enough buffering space between the corresponding edges of the synchronizing signals Hs and Vs. Therefore, the multiplexer selects the first clear reference signal as the clear signal of the counter. If the time difference with respect to the synchronizing signals Hs and Vs is less than the time period defined by the timebase signal, it means that there is no enough buffering space between the corresponding edges of the synchronizing signals Hs and Vs. Therefore, the multiplexer selects the second clear reference signal as the clear signal of the counter. According to the above description, the present invention can do a proper manipulation in response to the timing relation between the synchronizing signals Hs and Vs, whereby the OSD display region will not be affected by the adjustment of the adjustment parameter.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

The method and apparatus of the invention for preventing the jumping phenomenon of the OSD display region on a monitor screen is achieved mainly by using the manner of signal selection. In addition, the invention is limited to be applied to some special and known situations, thereby thoroughly solve the problem of the jumping phenomenon of OSD display region. Generally, the jumping phenomenon of the OSD display region occurs when the horizontal and vertical synchronizing signals are quite close in timing. That is, a pulse of the vertical synchronizing signal and a corresponding pulse of the vertical synchronizing signal are extremely close to each other. Therefore, the timing relation between the two signals may change when the user adjusts a display parameter, such the H-phase parameter, causing the OSD circuit to make a wrong judgement. In the present invention, the timing relation between the synchronizing signals Hs and Vs is first determined, then an appropriate clear signal is adopted for practically resetting the counter used in the OSD processing circuit.

Figure 1:
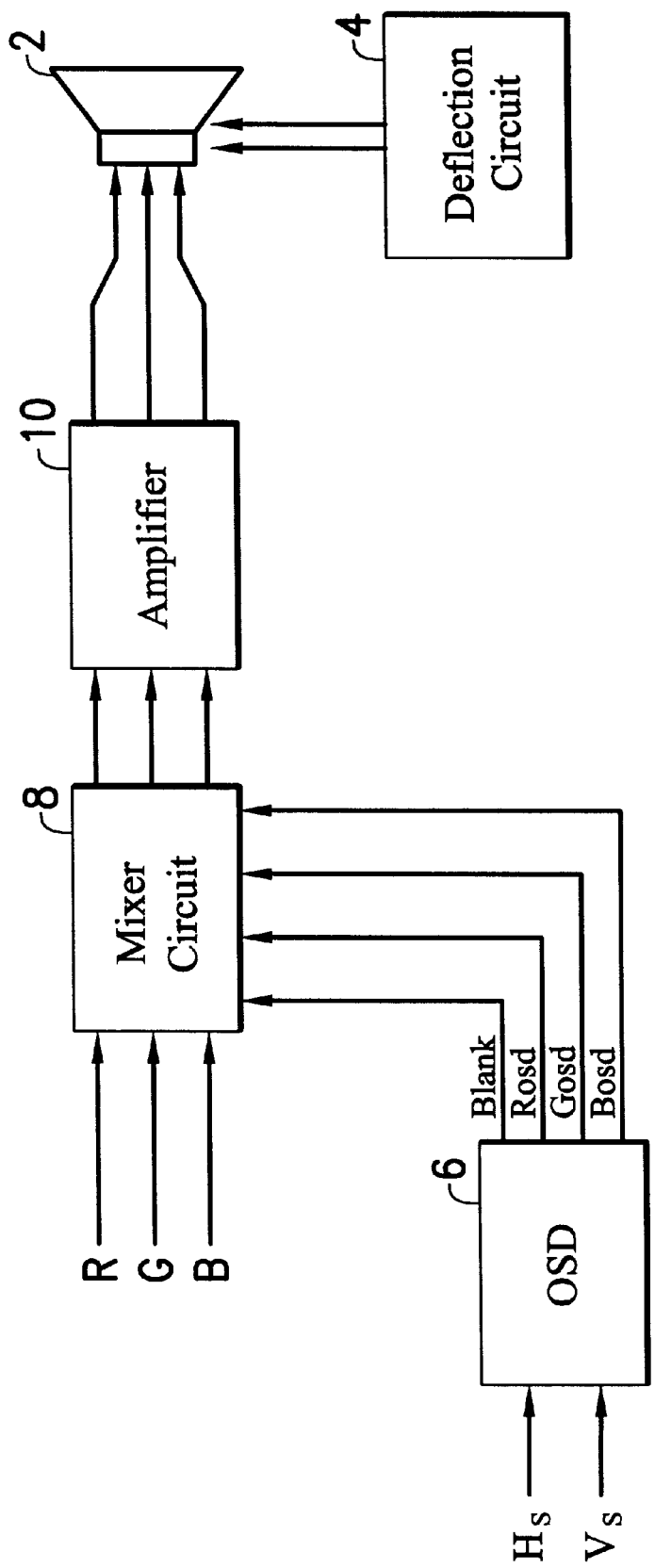
FIG. 1 (Prior Art) is a block diagram of the image-processing circuit of a display monitor with the OSD display function.
Figure 2:
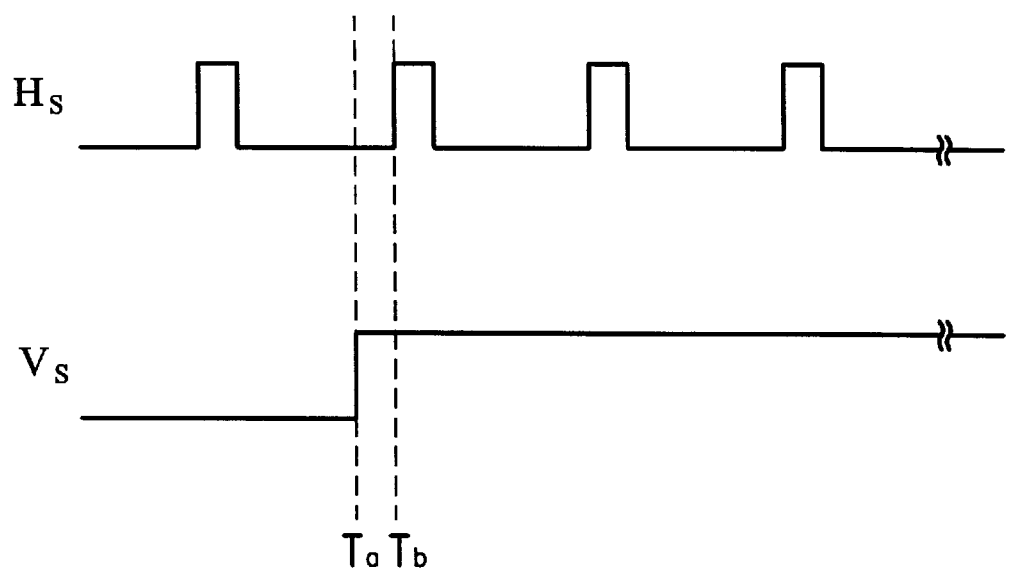
FIG. 2 and FIG. 3 (Prior Art) are timing diagrams of the horizontal synchronizing signal Hs and the vertical synchronizing signal Vs, before and after the adjustment of the H-phase parameter, respectively.
Figure 3:
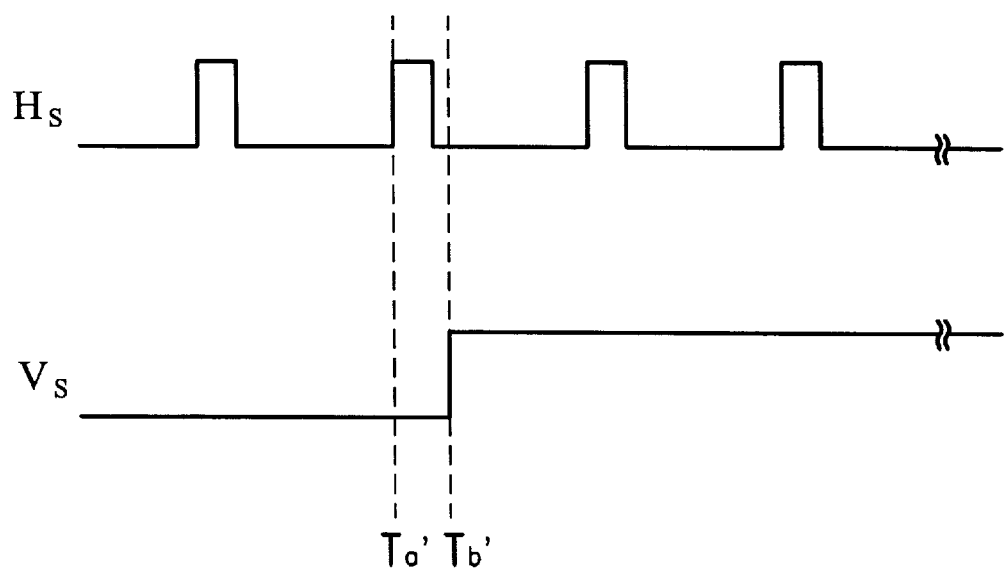
Figure 4:
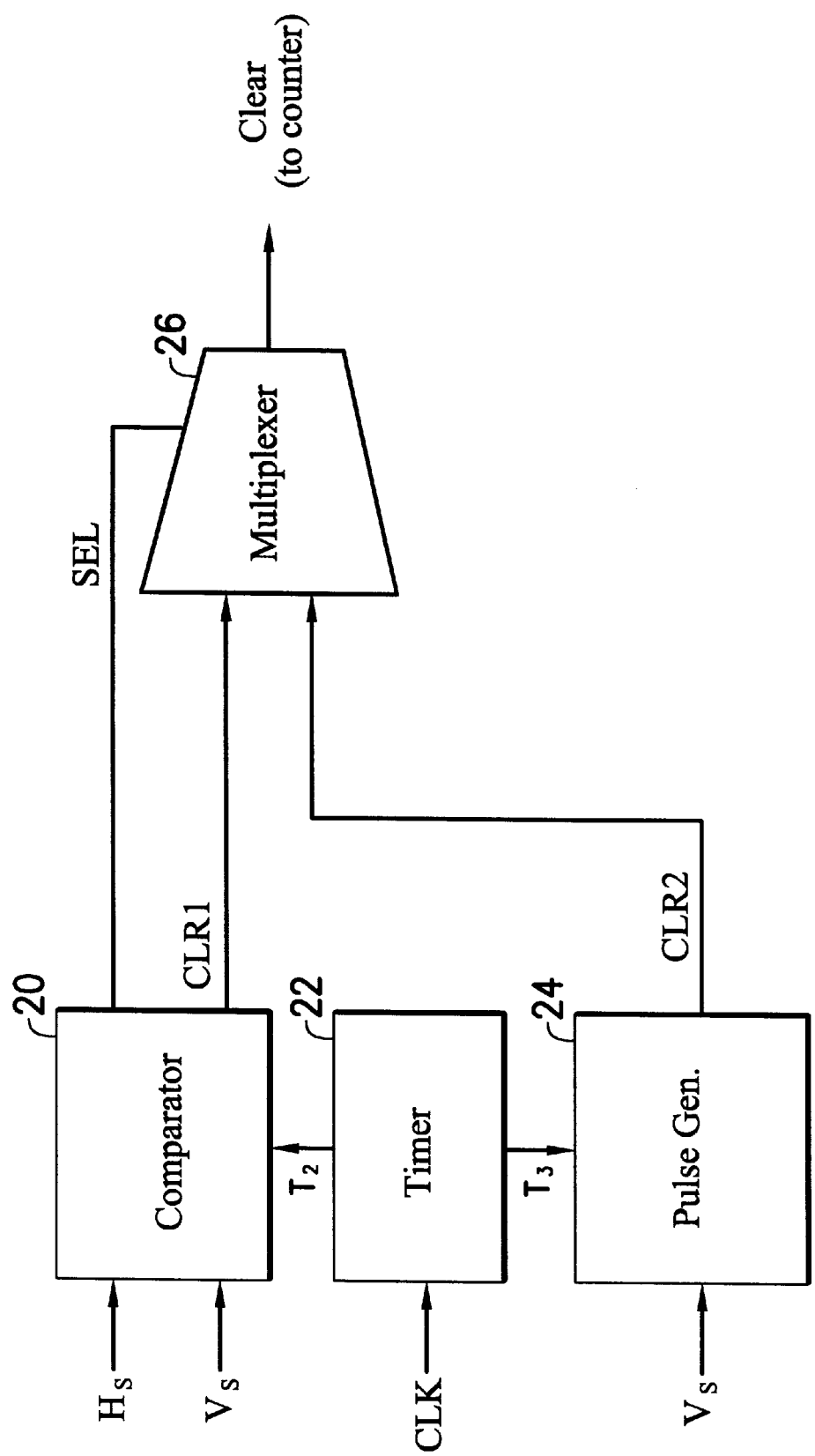
FIG. 4 is a circuit block diagram of an example of the anti-jumping circuit for preventing the jumping phenomenon of the OSD display region in accordance with the invention.

FIG. 4 is a circuit block diagram of an example of the anti-jumping circuit for preventing the jumping phenomenon of the OSD display region in accordance with the invention. As shown in FIG. 4, the circuit includes a comparison circuit 20, a timer 22, a pulse generator 24 and a multiplexer 26. The circuit shown in FIG. 4 is used to produce a clear signal for the counter (not shown) used in the OSD processing circuit. The counter is used for counting the scanning line. As described above, according to the timing relation between the horizontal synchronizing signal Hs and the vertical synchronizing signal Vs, the OSD processing circuit can determine the display region that is used for displaying the OSD menu and ready to be blanked. The practical implementation is to employ a counter for counting the number of synchronizing pulses of the horizontal synchronizing signal Hs, thereby determine the scanning line that is scanning now. Conventionally, the value of the counter will clear (that is, set to zero) at every front edges of the vertical synchronization signal Vs, which means the starting position of an image frame. The value of the counter increases by one at every front edges of the horizontal synchronization signal Hs (representing the starting of a scanning line). The OSD processing circuit may start to transmit a corresponding blanking signal BLK when the counting value reach a predetermined value representing the starting position of the OSD display region. This embodiment may control the real displayed position of the OSD display region on the monitor screen by means of the adjustment of the counter clear signal CLEAR, preventing the jumping phenomenon of the OSD display region.

The circuit shown in FIG. 4 first determines whether a buffer time between the front edges of the corresponding pulses of the synchronizing signals Hs and Vs is enough to prevent the jumping of the OSD display region. If the detection result can prove the stability of the OSD display region on the monitor screen, a first clear reference signal CLR1, which corresponds to the front edge of the vertical synchronizing signal Vs, can be chosen as the real clear signal CLEAR of the counter. If the jumping of the OSD display region might happen, a second clear reference signal CLR2, which is delayed for a delay time period T3 relative to the first clear reference signal CLR1, can be chosen as the real clear signal CLEAR of the counter. As shown in FIG. 4, comparison circuit 20 receives the synchronizing signals Hs and Vs. Therefore, comparison circuit 20 may produce the first clear reference signal CLR1 in response to the front edges of pulses of the vertical synchronizing signal Vs. In addition, pulse generator 24 can produce the second clear reference signal CLR2 in response to the front edges of the pulses of the vertical synchronizing signal Vs and the delay time period T3 received from timer 22. As a result, the second clear reference signal CLR2 is delayed for the delay time period T3, compared with the first clear reference signal CLR1. The function of the delay time period T3 is, in the situation that the jumping phenomenon of the OSD display region may happen, to keep enough buffer time between the pulse of the clear signal CLEAR and the two nearest pulses of the horizontal synchronizing signal Hs, ensuring that the first counted scanning line will not change when adjusting a display parameter, such as H-phase.

Another function of comparison circuit 20 is to compare the front edges of the corresponding pulses of the synchronizing signals Hs and Vs, determining which one of the two clear reference signals CLR1 and CLR2 should be chosen as the clear signal of the counter. In the present embodiment, comparison circuit 20 will acquire a difference time period T1 between the front edges of the corresponding pulses of the synchronizing signals Hs and Vs. Then comparison circuit 20 compares the difference time period T1 to a fixed time period T2 defined by a timebase signal received from timer 22 and generates a selection signal SEL. In this embodiment, the time period T2 can be regarded as a time range for defining a time window that uses the front edge of the pulse of the synchronizing signal Vs as a center. If any front edge of pulses of the horizontal synchronizing signal Hs falls within the time window, it means that the jumping phenomenon of the OSD display region may happen (since there is no enough buffer time between the front edges of the synchronizing signals Hs and Vs).

In more details, if the difference time period T1 does not fall within the time window defined by the time period T2, it means that there is enough buffer time between the front edges of Hs and Vs to prevent the jumping of the OSD menu. Therefore, in the normal operation, the adjustment of the display parameter will not change the timing relation between the synchronizing signal Vs and Hs. On the other hand, if the difference time period T1 falls within the time window defined by the time period T2, it means that there is no enough buffer time between the front edges of the corresponding pulses of Hs and Vs. Therefore, the adjustment of the display parameter may change the timing relation between the synchronizing signals Vs and Hs.

According to the above description, the setting of the selection signal SEL is described as follows. When the difference time period T1 is great than the time period T2, the selection signal SEL is set to be the logic state "0." When the difference time period T1 is less than the time period T2, the selection signal SEL is set to be the logic state "1." The selection signal SEL is sent to the selection control terminal of multiplexer 26 to choose one of the clear reference signals CLR1 and CLR2 as the real clear signal.

Comparison circuit 20 should be further described as follows. This embodiment adopts a front edge of a pulse of the vertical synchronizing signal Vs as a center of the time window and uses the time period T2 as the range of the time window relative to the center. As long as a front edge of a pulse of the horizontal synchronizing signal Hs leads or lags the front edge of the pulse of the vertical synchronizing signal Vs within the time period T2, it means that the clear signal CLEAR must be produced by a delay process. However, the manner described above should not limit the scope of the present invention. Different time windows defined by other manners can also be applied to the present invention. For example, two boundaries, before and after the center of the time window, can be set to different values. One example is that a boundary after the center (pulse edge of Vs) is still set to the time period T2 and another boundary before the center can be change to the pulse duration of the pulse of the synchronizing signal Hs. In order to manipulate such a time window, a judgment function that determines whether a front edge of the pulse of the vertical synchronizing signal Vs falls within the period the pulse duration (=1) of the horizontal synchronizing signal Hs is incorporated into comparison circuit 20. When the front edge of the pulse of Vs falls within the pulse duration of Hs, the incorporated function of comparison circuit 20 can help to decide whether there is enough buffer time between the corresponding pulse edges of the synchronizing signals Vs and Hs. According to the above description, the present can employ different ways to define the time window in various situations.

The timer 22 generates two timebase signals for defining the time period T2 and the time period T3 according to a clock signal CLK, where the time period T2 is transferred to comparison circuit 20 and the time period T3 is transferred to pulse generator 24. In the present embodiment, the time period T2 is about a quarter of the period of the horizontal synchronizing signal Hs and the time period T3 is about half of the period of the horizontal synchronizing signal Hs. In addition, the clock signal CLK is a basic frequency used for generating the above time constants. Preferably, the frequency of the clock signal CLK should be higher than that of the horizontal synchronizing signal Hs, such as 8 MHz and 12 MHz. The practical value of the time period T2 and the time period T2 can be determined by the timing of the synchronizing signals Vs/Hs and the maximal offset caused by adjusting the display parameter. The consideration for determining the time period T2 is the minimal requirement of the buffer time that can prevent the position-reverting of the corresponding pulses of the synchronizing signals Vs and Hs when the maximal offset occurs. The consideration for determining the time period T3 is the minimal requirement of the delay time that can keep enough buffer time between the front edge of the pulse of Vs and two adjacent pulses of Hs when the front edge of the pulse of the synchronizing signal Hs falls within the time period window defined by the time period T2.

Figure 5:
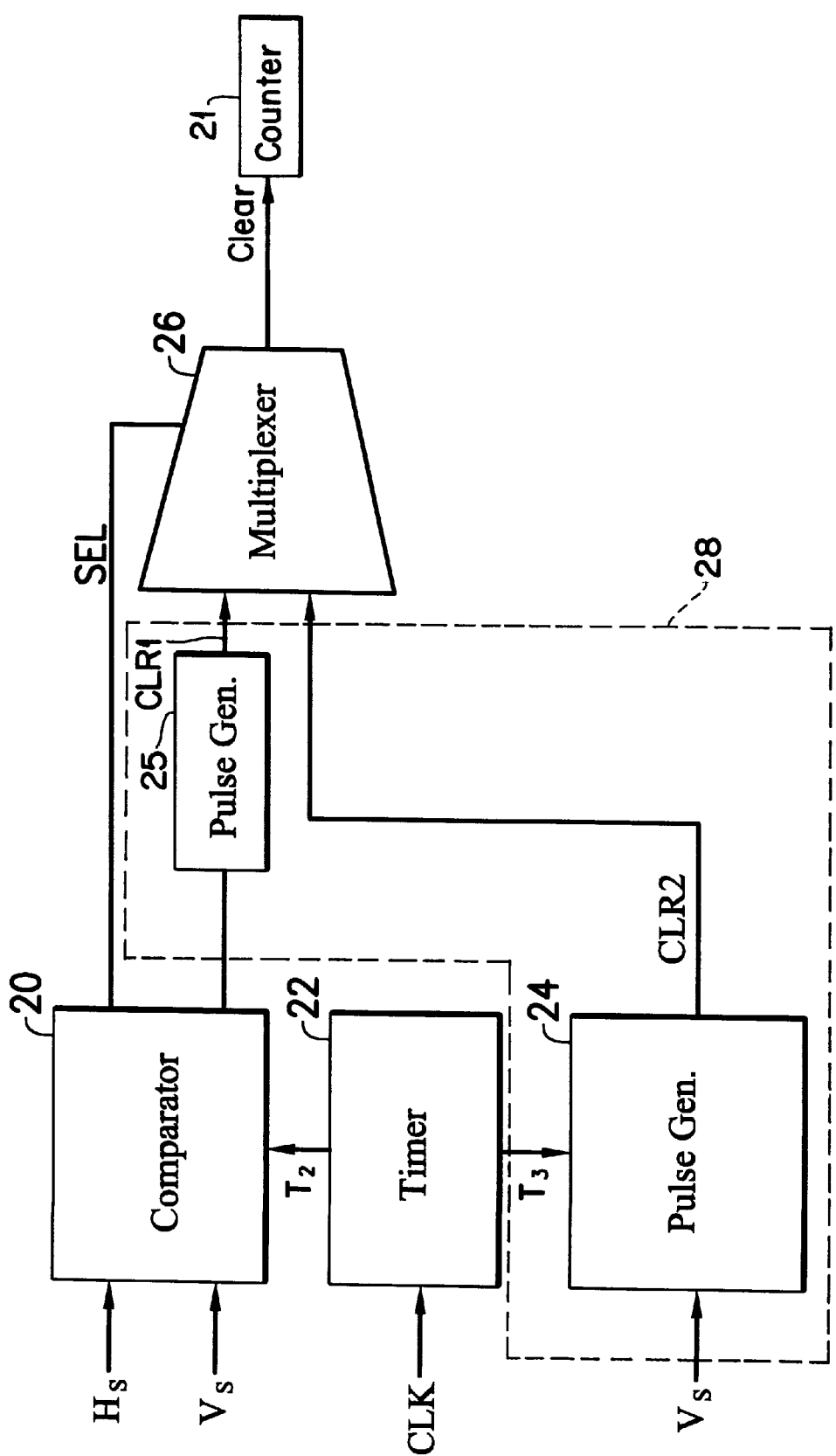
FIG. 5 is a circuit block diagram of another example of the anti-jumping circuit for preventing the jumping phenomenon of the OSD display region in accordance with the invention.

As described above, comparison circuit 20 and pulse generator 24 produce the first clear reference signal CLR1 and the second clear reference signal CLR2, respectively. The two clear reference signals will be chosen in different situations. Comparison circuit 20 produces the first clear reference signal CLR1 in response to the front edge of the pulse of Vs, to handle the situation where there is enough buffer time between the front edges of the corresponding pulses of the synchronizing signals Hs and Vs. Pulse generator 24 also produces the second clear reference signal CLR2 in response to the vertical synchronizing signal Vs, to handle the situation where there is no enough buffer time between the front edges of the corresponding pulses of the synchronizing signals Hs and Vs. There is a delay time period (T3) between the pulses of the clear reference signals CLR2 than CLR1. The first clear reference signal CLR1 and the second clear reference signal CLR2 are sent to input terminals of multiplexer 26, respectively. Although the first clear reference signal CLR1 is generated by comparison circuit 20 in this embodiment, such a generation manner should not limit the scope of the present invention. For example, FIG. 5 is another example of the anti-jumping circuit for preventing the jumping phenomenon of the OSD display region in this embodiment. As shown in FIG. 5, the clear reference signal generating function of comparison circuit 20 is taken over by a pulse generator 25 newly incorporated. Brief speaking, in the circuit shown in FIG. 5, pulse generator 25 and pulse generator 24 can produce the first clear reference signal CLR1 and the second clear reference signal CLR2, respectively. Other elements shown in FIG. 5 are the same as those denoted by the same numbers in FIG. 4. Furthermore, pulse generator 24 and pulse generator 25 can be merged into a signal generator 28 that can produce the first clear reference signal CLR1 and the second clear reference signal CLR2.

According to the selection signal SEL, the first clear reference signal CLR1 and the second clear reference signal CLR2, the operation of multiplexer 26 can be described as follows. When the selection signal SEL is in the logic state "0," there is enough buffer time between the front edges of the corresponding pulses of the synchronizing signals Hs and Vs. Therefore, multiplexer 26 can select the first clear reference signal CLR1 as the clear signal CLEAR of the counter 21 in response to the logic state of the selection signal SEL. When the selection signal SEL is in the logic state "1," the front edges of the corresponding pulses of the synchronizing signals Hs and Vs are relatively close. Therefore, multiplexer 26 can select the second clear reference signal CLR2 as the clear signal CLEAR of the counter 21 in response to the state of the selection signal SEL. As a result, no matter what kind of timing relation between Hs and Vs, the anti-jumping circuit still can generate an appropriate clear signal CLEAR of the counter 21 that is not influenced by the adjustment operation of the display parameter.

Figure 6:
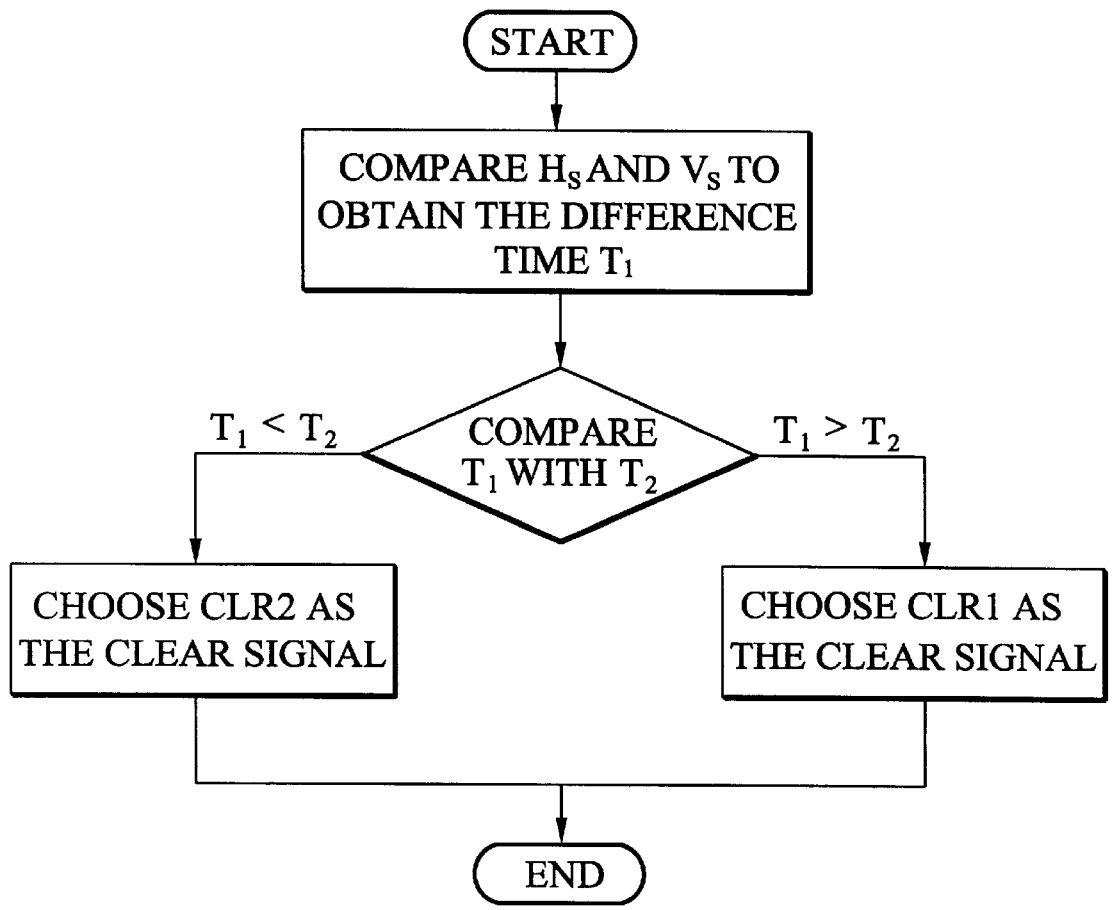
FIG. 6 is a flowchart showing the operation of the anti-jumping circuit shown in FIG. 4.

FIG. 6 illustrates the operational flowchart of the circuit shown in FIG. 4. First, comparison circuit 20 compares the front edges of the corresponding pulses of the synchronizing signals Hs and Vs to obtain the difference time period T1 (step S1). Then, comparison circuit 20 compares the difference time period T1 with the time period T2 which is provided by timer 22. If T1>T2, multiplexer 26 will select the first clear reference signal CLR1 as the clear signal CLEAR (step S3) in response to the logic state "0" of the selection signal SEL. If T1<T2, multiplexer 26 will select the second clear reference signal CLR2 as the clear signal CLEAR (step S4) in response to the logic state "1" of the selection signal SEL.

Three timing cases are further explained for clarity according to the circuit shown in FIG. 4 and the method shown in FIG. 6.

Figure 7:
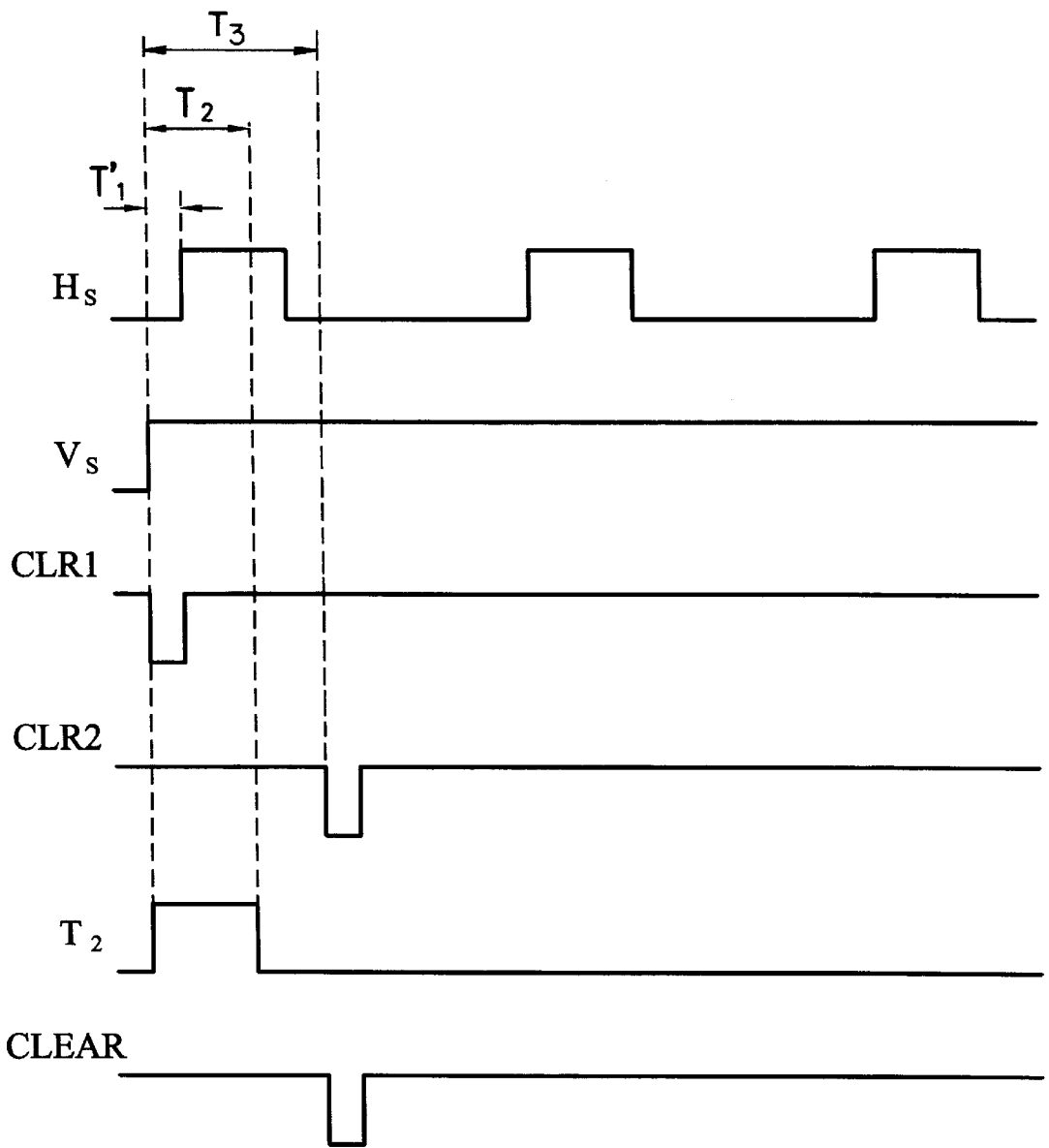
FIG. 7 is a timing diagram illustrating a first case of the timing relation between the synchronizing signals Hs and Vs for explaining the operation of the circuit shown in FIG. 4.

FIG. 7 illustrates a timing diagram related to the first timing case in the present embodiment. In FIG. 7, T1 denotes the time difference between the front edges of pulses of the synchronizing signals Hs and Vs. T2 denotes the timebase signal that is provided by timer 22. Pulse width of the timebase signal is the time period T2 described above. FIG. 7 shows a case where the difference time period T1 is greater than the time period T2. In other words, the timing relation between the synchronizing signals Hs and Vs will not be influenced by the adjustment operation of the H-phase parameter. Therefore, the first clear reference signal CLR1 is selected as the clear signal CLR fed to the counter.

Figure 8:
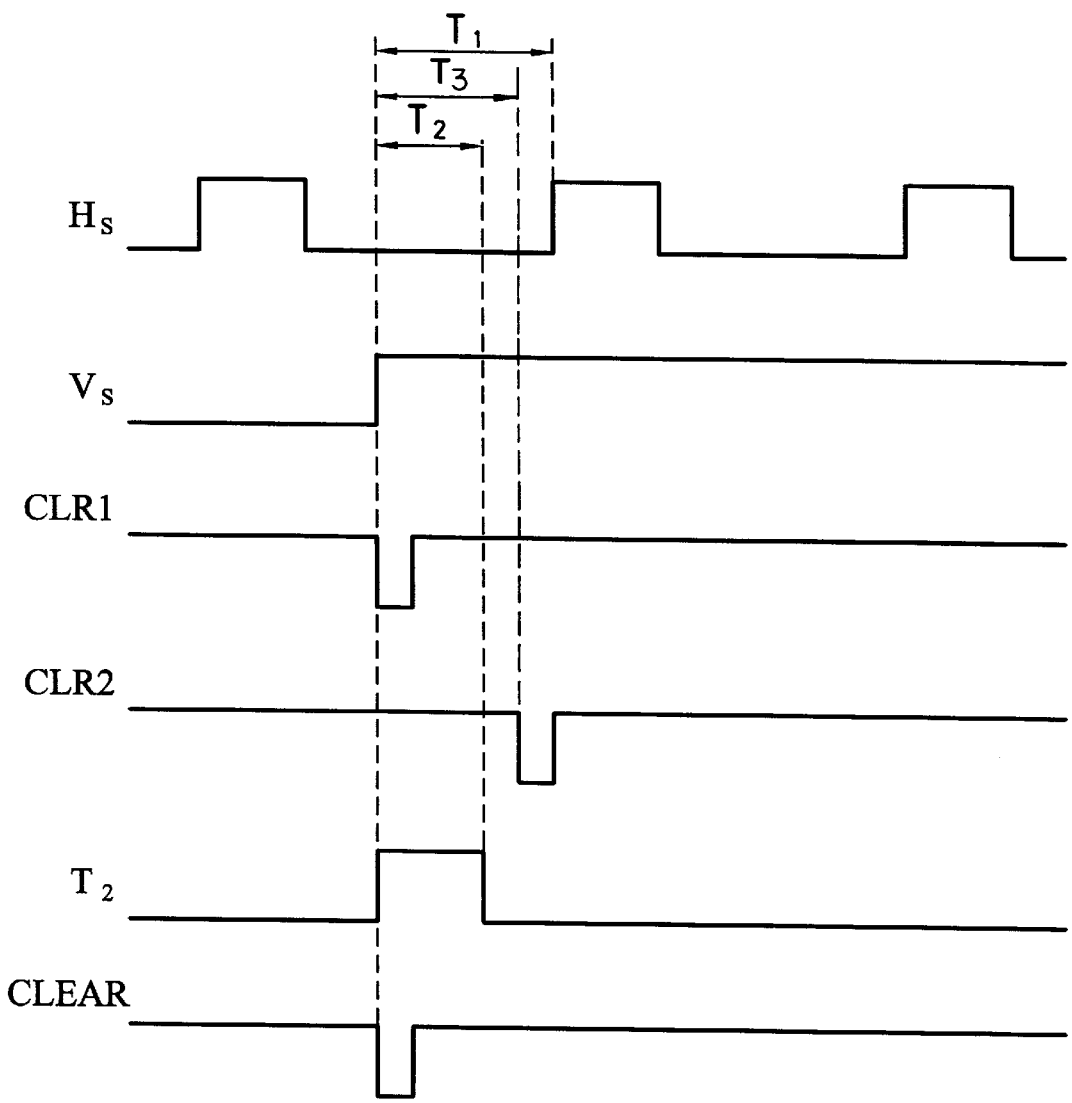
FIG. 8 is a timing diagram illustrating a second case of the timing relation between the synchronizing signals Hs and Vs for explaining the operation of the circuit shown in FIG. 4.

FIG. 8 illustrates a timing diagram related to the second timing case in the present embodiment. FIG. 8 shows a case where the difference time period T1' is less than the time period T2. In other words, the front edges of the pulses of the synchronizing signals Hs and Vs are very close. In addition, the front edge of the pulse of the vertical synchronizing signal Vs leads that of the horizontal synchronizing signal Hs. According to the timing relation of T1'<T2, comparison circuit 20 in FIG. 4 can produce a selection signal in the logic state "1." Next, multiplexer 26 can choose the second clear reference signal CLR2 as the clear signal CLEAR in response to the logic state of the selection signal SEL. Since the clear signal CLEAR is apart from the front edges of the pulses of the synchronizing signals Vs and Hs, the first scanning line counted by the counter is not influenced by the variation of the timing relation due to the adjustment of the H-phase parameter. As a result, the jumping phenomenon of the OSD display region will not happen.

Figure 9:
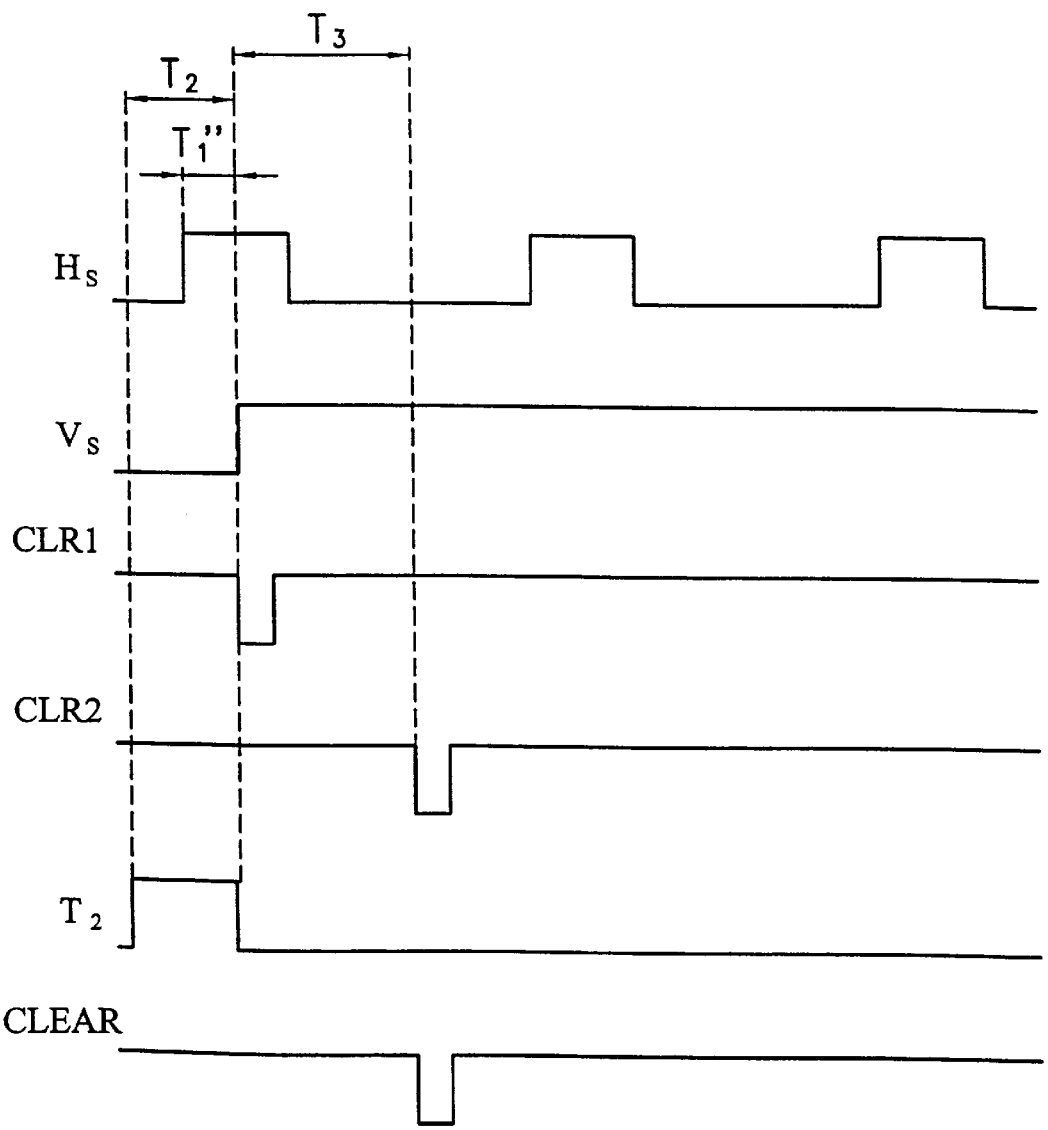
FIG. 9 is a timing diagram illustrating a third case of the timing relation between the synchronizing signals Hs and Vs for explaining the operation of the circuit shown in FIG. 4.

FIG. 9 illustrates a timing diagram related to the third timing case in the present embodiment. FIG. 9 shows a case where the difference time period T1" is less than the time period T2. However, in this case, the front edge of the pulse of the horizontal synchronizing signal Hs leads that of the vertical synchronizing signal Vs. Similar to the process described in the second timing case, comparison circuit 20 can produce a selection signal in the logic state "1" and multiplexer 26 can choose the second clear reference signal CLR2 as the clear signal CLEAR in response to the logic state of the selection signal SEL.

According the three timing cases shown in FIG. 7, FIG. 8 and FIG. 9, the present embodiment can solve the jumping problem existed in various timing situations associated with the synchronizing signals Hs and Vs. Therefore, the object of the present invention is achieved.

While the invention has been described by way of and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus for preventing the jumping phenomenon of an OSD display region on a monitor screen, the apparatus producing a clear signal to clear a counter for counting the number of scanning lines in the monitor screen according to a horizontal synchronizing signal and a vertical synchronizing signal, comprising:

a comparison circuit for producing a first clear reference signal according to the vertical synchronizing signal, and a selection signal according to a time difference between the front edge of a pulse of the horizontal synchronizing signal and the front edge of a corresponding pulse of the vertical synchronizing signal, the selection signal being set to a first logic state when the time difference is less than a fixed time period and to a second logic state when the time difference is greater than the fixed time period;

a pulse generator for producing a second clear reference signal according to the vertical synchronizing signal, the second clear reference signal being delayed for a delay time period relative to the first clear reference signal; and a multiplexer for selecting one of the first clear reference signal received from the comparison circuit and the second clear reference signal received from the pulse generator as the clear signal according to the selection signal received from the comparison circuit, the first clear reference signal serving as the clear signal when the selection signal is in the first logic state and the second clear reference signal serving as the clear signal when the selection signal is in the second logic state.

2. The apparatus as claimed in claim 1, wherein the comparison circuit generates said first clear reference signal according to the front edge of the corresponding pulse of the vertical synchronizing signal.

3. The apparatus as claimed in claim 1, further comprising a timer for generating a timebase signal to define the fixed time period.

4. The apparatus as claimed in claim 1, wherein the selection signal is set to the second logic state when the front edge of the pulse of the vertical synchronizing signal is located in the period of the corresponding pulse of the horizontal synchronizing signal.

5. An apparatus for preventing the jumping phenomenon of an OSD display region on a monitor screen, the apparatus producing a clear signal to clear a counter for counting the number of scanning lines in the monitor screen according to a horizontal synchronizing signal a vertical synchronizing signal, comprising:

a comparison circuit producing a selection signal according to a time difference between the front edge of a pulse of the horizontal synchronizing signal and the front edge of a corresponding pulse of the vertical synchronizing signal, the selection signal being set to a first logic state when the time difference is less than a fixed time period and to a second logic state when the time difference is greater than the fixed time period;

a first pulse generator for producing a first clear reference signal according to the vertical synchronizing signal;

a second pulse generator for producing a second clear reference signal according to the vertical synchronizing signal, the second clear reference signal being delayed for a delay time period relative to the first clear reference signal; and a multiplexer for selecting one of the first clear reference signal received from the first pulse generator and the second clear reference signal received from the second pulse generator as the clear signal according to the selection signal received from the comparison circuit, the first clear reference signal serving as the clear signal when the selection signal is in the first logic state and the second clear reference signal serving as the clear signal when the selection signal is in the second logic state.

6. The apparatus as claimed in claim 5, wherein the first pulse generator generates the first clear reference signal according to the front edge of the corresponding pulse of the vertical synchronizing signal.

7. The apparatus as claimed in claim 5, further comprising a timer for generating a timebase signal to define the fixed time period.

8. The apparatus as claimed in claim 5, wherein the selection signal in the comparison circuit is set to the second logic state when the front edge of the pulse of the vertical synchronizing signal is located in the period of the corresponding pulse of the horizontal synchronizing signal.

9. A method for preventing the jumping phenomenon of an OSD display region on a monitor screen, the method producing a clear signal to clear a counter for counting the number of scanning lines in the monitor screen according to a horizontal synchronizing signal and a vertical synchronizing signal, comprising:

calculating a time difference between the front edge of a pulse of the horizontal synchronizing signal and the front edge of a corresponding pulse of the vertical synchronizing signal;

producing a first clear reference signal and a second clear reference signal, wherein the first clear reference signal corresponds to the front edge of the pulse of the vertical synchronizing signal and the second clear reference signal is delayed for a delay time period relative to the first clear reference signal; and choosing one of the first clear reference signal and the second clear reference signal according to the time difference as the clear signal, the first clear reference signal serving as the clear signal when the time difference is greater than a fixed time period the second clear reference signal serving as the clear signal when the time difference is less than the fixed time period.

10. The method as claimed in claim 9, further comprising:

producing a timebase signal by using a timer to define the fixed time period relative to the pulse of the vertical synchronizing signal.

11. The method as claimed in claim 9, wherein choosing one of the first clear reference signal and the second clear reference signal further comprises:

generating a selection signal, which is set to a first logic state when the time difference is greater than the fixed time period and set to a second logic state when the time difference is less than the fixed time period; and inputting the first clear reference signal and the second clear reference signal to a multiplexer and inputting the selection signal to a selection control terminal of the multiplexer, whereby the multiplexer outputs the first clear reference signal when the selection signal is in the first logic state and outputs the second clear reference signal when the selection signal is in the second logic state.

12. The method as claimed in claim 9, further comprising:

setting the selection signal as the second logic state when the front edge of the pulse of the vertical synchronizing signal is located in the period of the corresponding pulse of the horizontal synchronizing signal.

13. The method as claimed in claim 12, wherein choosing one of the first clear reference signal and the second clear reference signal further comprises:

generating a selection signal, which is set to a first logic state when the time difference is great than the fixed time period and set to a second logic state when the time difference is less than the fixed time period; and inputting the first clear reference signal and the second clear reference signal to a multiplexer and inputting the selection signal to the selection control terminal of the multiplexer, whereby the multiplexer outputs the first clear reference signal when the selection signal is in the first logic state and the outputs the second clear reference signal when the selection signal is in the second logic state.

14. An apparatus for determining an OSD display region by using a counter for counting scanning lines, comprising:

a comparison circuit for calculating a time difference between the front edge of a pulse of a vertical synchronizing signal and the front edge of a corresponding pulse of a horizontal synchronizing signal to generate a selection signal, the selection signal being set to a first logic state when the time difference is greater than a fixed time period T2 and set to a second logic state when the time difference is less than the fixed time period T2;

a signal generator for generating a first clear reference signal and a second clear reference signal, the first clear reference signal instantaneously corresponding to the vertical synchronizing signal and the second clear reference signal being delayed for a fixed time period T3 relative to the vertical synchronizing signal, the fixed time period T3 being greater than the fixed time period T2; and a multiplexer for selecting the first clear reference signal as the clear signal of the counter when the selection signal is in the first logic state, and selecting the second clear reference signal as the clear signal of the counter when the selection signal is in the second logic state.

* * * * *